United States Patent
Darby et al.

(10) Patent No.: US 6,280,846 B1
(45) Date of Patent: Aug. 28, 2001

(54) RESINS AND COMPOSITES CONTAINING THEM

(75) Inventors: Paul Darby, Grimsby; Paul Sutton, Cardiff, both of (GB)

(73) Assignee: Cray Valley Limited, Gwent (GB)

( * ) Notice: Subject to any disclaimer, the term of this patent is extended or adjusted under 35 U.S.C. 154(b) by 0 days.

(21) Appl. No.: 09/377,786

(22) Filed: Aug. 20, 1999

(30) Foreign Application Priority Data

Aug. 21, 1998 (GB) .................................................. 98 18336

(51) Int. Cl.[7] ....................................................... C08L 67/06
(52) U.S. Cl. ....................... 428/420; 428/357; 428/297.4; 523/522; 523/523; 523/400; 523/464; 523/465; 523/500; 523/511; 525/44; 525/49
(58) Field of Search .................................... 523/522, 523, 523/400, 464, 415, 500, 511; 428/357, 297.4, 430; 525/44, 49

(56) References Cited

U.S. PATENT DOCUMENTS

| 4,222,927 | | 9/1980 | Schulz-Walz et al. ............. 260/40 R |
| 4,857,111 | * | 8/1989 | Haubennestel et al. . |
| 5,248,333 | | 9/1993 | Worschech et al. .............. 106/38.24 |

FOREIGN PATENT DOCUMENTS

| 2551144 | 5/1977 | (DE) | ................................. C08J/3/02 |
| 0 343 764 | 11/1989 | (EP) | ............................... C08L/67/06 |

* cited by examiner

*Primary Examiner*—Richard Weisberger
(74) *Attorney, Agent, or Firm*—Whyte Hirschboeck Dudek SC

(57) ABSTRACT

Curable compositions for making fibre-reinforcement structural composites such as GRP comprise an unsaturated polyester resin base, a co-polymerizable monomer and preferably, one or more performance-enhancing additives. Thixotropy is endowed by 5% by weight or less of an organic amide.

20 Claims, No Drawings

RESINS AND COMPOSITES CONTAINING THEM

FIELD OF THE INVENTION

The present invention relates to polyester resins of the kind used to make fibre-reinforced structural composites, preferably although not exclusively, of the laminated type, such as glass fibre-reinforced plastic (GRP) or resin composites reinforced with polymer fibres. Although it is not usual to use polyester resins for carbon fibre-reinforced resin components, that is also theoretically possible. These polyester resins conventionally are based on an unsaturated polyester resin and a co-polymerisable unsaturated monomer such as styrene.

BACKGROUND OF THE INVENTION

Such composites are used extensively in the building construction sectors, automotive/transport sectors, for chemical resistant applications, and in sports and leisure applications notably boat building. The conversion of the polyester resin and reinforcing fibres to form the required structure, consitutes the moulding process. In Europe, a significant part of the structural composites sector utilises open moulds and spray-up or hand lay-up as the moulding process. Generally, the requisite parts are three-dimensional in shape which require application of resin to vertical mould surfaces. The polyester resins should not be excessively high in viscosity for satisfactory spray/roller application. Conversely, low resin viscosity would result in extensive drainage from mould/part vertical surfaces. A satisfactory solution is reached by modifying the rheology of the liquid resins by incorporation of thixotropic structuring agents.

The thixotropic agent used predominantly in polyester resins is fumed silica. Although fumed silica does confer the required structure-imparting properties, it suffers from a number of limitations. One such disadvantage is due to the fine dust nature of the material, which makes it unpleasant and hazardous to handle. Another drawback is the requirement for high shear, capital intensive dispersion equipment for satisfactory incorporation. Lastly, fumed silica has a tendency to sediment in the resin on storage with consequent loss in structure and thixotropic performance.

The latter problem (sedimentation or separation) is particularly performance-limiting and is exacerbated by the use of low viscosity resins now popular in spray/lay up. This sedimentation effect is often rate-determining in designating shelf life.

Corrective procedures before use of the resin involve redispersion, which may not be practical in bulk storage or 1 cubic metre totes. Use of sedimented resin can result in generation of defective parts and scrap. A number of additives can be used in conjunction with the silica that can slow down the sedimentation, but none of them completely alleviates the problem.

Consequently, improved thixotropic solutions have been sought for many years. It is a reflection of the difficulty of the challenge, that despite the efforts invested, fumed silica remains the predominant thixotropic agent. Other products have come to market which counter the sedimentation problem, but impart drawbacks on other parameters. Such products include clays and organo-modified clays which necessitate a "pre-gel" stage for their incorporation. However, with these alternative materials, colour, air entrapment, gel time stability and mechanical properties may be adversely affected.

Thus, there remains a need for a partial or total replacement for fumed silica for the purpose of imparting thixotropy to resins intended for production of fibre-reinforced composites which does not have the disadvantages of the latter material, does not introduce different, significant disadvantages of its own and does not incur a significant cost penalty. This need has now been met by using an organic amide as the agent for producing thixotropic shear thinning.

It is already known to incorporate amides in coating compositions which contain an unsaturated polyester resin and a co-polymerisable unsaturated monomer such as styrene. In particular, such a coating composition is used for gelcoat compositions. Gelcoats are used as a protective layer, for example on the hulls of boats made from GRP. According to a current product data sheet of Kusumoto Chemicals Ltd, such an amide may be incorporated in gelcoat compositions in a form predispersed in a non-polymerisable organic solvent (xylene) such that the total amount of xylene is present at from 2% to 3% by weight of the composition. However, such a solvent level in a composition for making fibre-reinforced structural composites would result in a very poor quality product. Moreover, this data sheet provides no motivation for the person skilled in the art to use such amides in resins for making fibre-reinforced structural composites.

Another data sheet of Kusumoto Chemical Ltd suggests incorporating a polyamide dispersed in styrene monomer into moulding compounds (i.e. compositions of resins with chopped glass fibre for making press-mouldings) as well as gelcoats and other coatings. The amount of amide proposed is equivalent to a level of from 0.05% to 0.3% by weight in the moulding composition. The compositions of the present invention are especially, although not exclusively, intended for use in fibre-reinforced compositions of the laminated type, generally those produced by hand-lay and spray-up. There is no simple extrapolation from moulding compounds to laminated structural applications for a number of reasons. The chopped fibres in the moulding composition result in a different rheology and moulding compositions contain very high levels of filler, typically calcium carbonate. For laminates, thixotropic shear thinning is essential whereas for moulding, only thickening is required (for ease of handling and to prevent separation of the resin from the filler and chopped glass). Moreover, the maximum amount specified (0.3%) in the aforementioned data sheet makes it totally unsuited to laminate applications.

SUMMARY OF THE INVENTION

Thus, according to a first aspect of the present invention, there is provided a composition for moulding of fibre-reinforced structural composites, the composition comprising:

(a) an unsaturated polyester resin, (b) a co-polymerisable monomer, and (c) from 0.4% to 5% by weight of the total composition of an organic amide thixotropic agent;

the composition comprising less than 2% by weight of the total composition of non-polymerisable organic solvent.

The performance of compositions according to the present invention has been found to be stable over extensive storage times.

The amount of the thixotropic agent in compositions according to the present invention is from 0.4% to 5% by weight of the total composition, but preferably, it is present at from 0.5% to 3% by weight.

Preferably, the amount of non-polymerisable organic solvent in the compositions according to the present invention is no more than 1.5%, more preferably no more than 1%, still more preferably no more than 0.5% by weight of the total composition. It is especially preferred for such solvent to be substantially completely absent.

Preferably, the thixotropic agent comprises one or more amide oligomers and/or amide polymers, which, oligomers and polymers incorporate a hydroxy-functional acid. Preferably, they have a number average molecular weight of from 250 to 1 500, more preferably from 290 to 1 000. The most preferred materials include hydroxystearic acid or hydrogenated castor oil fatty acid. Other saturated acids can be included such as decanoic, dodecanoic (lauric) and hexadecanoic (palmitic). The preferred diamines are ethylene and hexamethylene diamine, although other aliphatic diamines are also suitable. The amides are prepared by condensation in a fusion process to acid and amine values below 10 mgKOH/g. To facilitate subsequent dispersion, it is preferred that the amide solids are micronised so that more than 99% by weight of the amide solids particles are less than 45 microns in diameter.

It is also preferred to incorporate in compositions according to the present invention, one or more performance-enhancing additives.

Typical performance-enhancing additives are as follows, with amounts as quoted (by weight of total composition):

inhibitors to impart stability and shelf life (50–500 ppm)

accelerators to promote cure at workshop/mould temperatures typically cobalt soaps and amine compounds (0.01–0.5%)

pigments for hide and cosmetic characteristics (0.5–10%)

fillers to confer rigidity or fire retardant characteristics (5–60%)

halogen and phosphorus compounds similarly to impart fire retardancy (2–15%)

film forming compounds to reduce surface tack and styrene emissions from the laminate surface (0.05–2%)

In compositions according to the present invention, the amount of unsaturated polyester resin (which optionally may comprise two or more different such resins) is typically from 20% to 75%, preferably from 25% to 65%, more preferably from 30% to 60% by weight of the total composition.

The unsaturated polyester resin is suitably formed from the polycondensation of polybasic acids and anhydrides with polyhydric alcohols, with dibasic acids/anhydrides and dihydric alcohols most commonly employed. Typical acids/anhydrides include maleic anhydride, phthalic anhydride, isophthalic acid, terephthalic acid and fumaric acid. Typical alcohols include 1,2-ethanediol, 1,3-propanediol, diethylene glycol and dipropylene glycol. Monofunctional acids or alcohols may also be employed as chain terminators. The ethylenically unsaturated groups are essential to serve as cross-linking sites during the curing process. The unsaturated polyester resin may also be formulated to include dicyclopentadiene and/or cyclopentadiene. The resin polycondensation is generally conducted as a batch process between 150 and 220° C. either by a fusion or azeotropic process. A degree of polymerisation is typically achieved corresponding to an acid value of between 5 and 50 mgKOH/g and a number average molecular weight of between 500 and 4000. The resin is diluted in the unsaturated monomer and may be stabilised by the addition of inhibitor such as hydroquinone.

The unsaturated polyester resin is typically prepared in a high temperature polycondensation reactor prior to let-down in the monomeric reactive diluent. Addition of the organic thixotropic agent and performance-inducing additives is by way of an ambient or near ambient temperature dispersion phase, or optionally the thixotropic agent may be added via a pre-gel stage. The derived resins exhibit pronounced thixotropic shear thinning behaviour ideally suited for spray/lay-up applications.

The co-polymerisable monomer will normally be present in an amount of from 20% to 55%, preferably from 20% to 50%, more preferably from 25% to 45% by weight of the total composition.

The co-polymerisable monomer serves to both mobilise the unsaturated polyester resin and to act as a co-polymerisable cross-linker in the curing phase. For techno-economic reasons, styrene is generally employed, but other monomers may also be included such as α-methylstyrene, vinyl toluene, methyl methacrylate and diallyl phthalate.

Although the present invention uses an organic amide thixotropic agent as a substitute for fumed silica because of the disadvantages of the latter, optimum performance in terms of minimal sedimentation together with desired shear thinning behaviour is achieved by simultaneous incorporation of minor amounts of fumed silica, for example from 0.1% to 2.5%, preferably from 0.2% to 1.2% by weight of the composition.

The thixotropic agent may be incorporated into compositions according to the present invention in one of several different ways.

First, it may be incorporated into the unsaturated polyester resin material itself. This process entails batch or in-line dispersion of the thixotropic agent in the polyester resin by admixture therewith, before the resin is mixed with any other ingredients. This has the advantage that it is compatible with conventional plant and processing of silica-based polyester resins.

A second, alternative, method of incorporating the thixotropic agent is in the form of a pregel in the co-polymerisable monomer. A pregel is a high viscosity solution or dispersion of the thixotropic agent in another medium. The process typically consists of forming the pregel, followed by batch dispersion of the pregel in the other ingredients. The advantage of this approach is reduction of dispersion times at the final processing stage.

A third possibility for incorporating the thixotropic agent is in the form of a heat-activated pregel in a mixture of the co-polymerisable monomer and an organic solvent. A heat-activated pregel, means a pregel that has been heat treated. This process of incorporation may for example comprise dispersion of the thixotropic agent in a suitable medium, followed by heat treatment at about 50° C. prior to dispersion in the resin. This process of incorporation has the advantage that lower levels of the thixotropic agent can be used for a given performance level. The organic solvent preferably contains one or more -OH groups and is typically a lower alcohol such as ethanol or propanol, or a polyol such as ethylene glycols or propylene glycol, or it may for example be industrial methylated spirit or benzyl alcohol. The weight ratio of the co-polymerisable monomer to the solvent is preferably from 5:1 to 10:1, more preferably from 6:1 to 9:1.

The compositions containing both the organic amide thixotropic agent and fumed silica can be prepared by the first-aforementioned method. If the second or third method is used, the silica should be dispersed with the pregel in the resin.

The present invention further extends to a method of producing a fibre-reinforced composite such as a glass-fibre reinforced composite or a carbon fibre-reinforced composite. The method comprises forming fibre reinforcement material together with a composition according to the present invention into a desired shape, and curing the composition.

The present invention also includes an article comprising a fibre-reinforced composite which comprises a fibre reinforcement material and a cured composite according to the present invention.

The invention will now be explained in more detail by way of the following non-limiting examples.

EXAMPLES

A. Unsaturated Polyester Resin Base

Maleic anhydride/phthalic anhydride/propylene glycol in the molar ratio 1.0:1.0:2.1 were condensed in a fusion process to give a resin of acid value 30 mgKOH/g and number average molecular weight Mn 1 400. The resin was dissolved in styrene to give 65% (±2%) solids and stabilised with 100 ppm hydroquinone.

B. Organic Thixotropic Agent

Hydrogenated castor oil fatty acid (60 parts) and decanoic acid (28 parts) were heated to 80° C. Ethylene diamine (11 parts) was charged and the batch allowed to exotherm to ca 120° C. with salt formation. The batch was heated to 200° C. and condensed to acid and amine values less than 10 mgKOH/g, discharged, allowed to solidify and micronised so that 99% was less than 45 microns.

C. Performance-Enhancing Additives

The following additives were dispersed into a blend of 85 parts resin base A and 15 parts styrene:

| pph | |
| --- | --- |
| 0.15 | Air release additive (ex BYK Chemie A555) |
| 0.05 | Phenyl diethanolamine |
| 0.15 | Cobalt octoate 10% |
| 0.01 | Hydroquinone |
| 0.75 | LSE film forming additive in carrier medium (ex BYK Chemie S740) |

Example 1

940 kg Resin base A and 155 kg styrene was charged to a 1 500 L mixer equipped with an in-line rotor/stator disperser.

13.4 kg of the organic thixotropic agent B was charged to the mixer and the batch was recirculated through the disperser until a Hegman grind of 6 was achieved. Performance additives C in the same ratio to the resin base A were dispersed to give a resin with the following properties:

| Solids | 58% |
| --- | --- |
| Rotational viscosity @ 25° C. (ISO 3219) | 0.24 Pa.s (2.4 p) |
| Brookfield RVT @ 25° C. (Spindle 2, 5/50 rpm) (ISO 2555) | 2.2/0.7 Pa.s (22/7 p) |
| Gel time @ 25° C., 2% M50 MEKP (ISO 2535) | 16 minutes |

Example 2

92.5 parts of styrene was heated to 50° C. in a mixer equipped with a high speed batch dissolver. 7.5 parts of the organic thixotropic agent B was charged with the dissolver at 1500 rpm. The resultant gel was allowed to cool to 20° C. 16.0 parts of this pregel was charged to 84 parts Resin base A with the dissolver at 1500 rpm giving a resin with the following properties:

| Solids | 55% |
| --- | --- |
| Brookfield RVT @ 25° C. (Spindle 2, 5/50 rpm) | 1.6/0.5 Pa.s (16/5 p) |

Example 3

940 kg of Resin base A and 155 kg styrene were charged to a 1500 L mixer equipped with an in-line rotor/stator disperser.

6.6 kg of the organic thixotropic agent B and 4.4 kg of fumed silica (Cabot M5) werec charged to the mixer and the batch was recirculated through the disperser until a Hegman grind of 5 was achieved. Performance additives C in the same ratio to the resin base were dispersed to give a resin with the following properties:

| Solids | 58.5% |
| --- | --- |
| Rotational viscosity @ 25° C. | 0.27 Pa.s (2.7 p) |
| Brookfield RVT @ 25° C. (Spindle 2, 5/50 rpm) | 2.0/0.7 Pa.s (20/7 p) |
| Gel time @ 25° C., 2% M50 MEKP | 19 minutes |

Example 4

To 80 parts of styrene inhibited with 100 ppm tertiary-butyl catechol, was added 10 parts ethanol and 10 parts of organic thixotropic agent C. The dispersion was heated to 50° C. and maintained at >50° C. for 24 hours.

To 25 parts of Resin base A were added 10 parts of the above pregel and dispersed to give a highly structured gel. A further 60 parts of Resin base A and 4 parts styrene were blended to give a resin with the following properties:

| Solids | 57% |
| --- | --- |
| Rotational viscosity @ 25° C. | 0.27 Pa.s (2.7 p) |
| Brookfield RVT @ 25° C. (Spindle 2, 5/50 rpm) | 2.6/0.7 Pa.s (26/7 p) |

What is claimed is:

1. A composition for moulding of fibre-reinforced structural composites, the composition comprising:
    (a) an unsaturated polyester resin,
    (b) a co-polymerisable monomer, and
    (c) from 0.4% to 5% by weight of the total composition of an organic amide thixotropic agent;
        the composition comprising less than 2% by weight of the total composition of non-polymerisable organic solvent.

2. A composition according to claim 1, further comprising fumed silica in an amount from 0.1% to 2.5% by weight of the total composition.

3. A composition according to claim 1, wherein the thixotropic agent comprises one or more amide oligomers and/or polymers which incorporate a hydroxy-functional acid.

4. A composition according to claim 1, wherein the organic amide has acid and amine values each less than 10 mgKOH/g.

5. A composition according to claim 1, wherein the thixotropic agent is in the form of a particulate solid wherein more than 99% by weight of the particles have a diameter less than 45 microns.

6. A composition according to claim 1, further comprising one or more performance-enhancing additives.

7. A composition according to claim 1, further comprising fumed silica.

8. A method for producing a composition according to claim 1, wherein the thixotropic agent is admixed with the unsaturated polyester resin, before the resin is mixed with any other ingredient(s).

9. A method for producing a composition according to claim 1, wherein the thixotropic agent is incorporated in the form of a pregel in the co-polymerisable monomer.

10. A method for producing a composition according to claim 1, wherein the thixotropic agent is incorporated in the form of a heat-activated pregel in a mixture of the co-polymerisable monomer and an organic solvent.

11. A method of producing a fibre-reinforced composite, the method comprising forming fibre reinforcement material together with a composition according to claim 1 into a desired shape, and curing the said composition.

12. An article comprising a fibre-reinforced composite which comprises fibre-reinforcement material and a cured composition according to claim 1.

13. A composition according to claim 2, wherein the thixotropic agent comprises one or more amide oligomers and/or polymers which incorporate a hydroxy-functional acid.

14. A method for producing a composition according to claim 2, wherein the thixotropic agent is admixed with the unsaturated polyester resin, before the resin is mixed with any other ingredient.

15. A method for producing a composition according to claim 3, wherein the thixotropic agent is admixed with the unsaturated polyester resin, before the resin is mixed with any other ingredient.

16. A method for producing a composition according to claim 4, wherein the thixotropic agent is admixed with the unsaturated polyester resin, before the resin is mixed with any other ingredient.

17. A method for producing a composition according to claim 13, wherein the thixotropic agent is admixed with the unsaturated polyester resin, before the resin is mixed with any other ingredient.

18. A composition for moulding of fibre-reinforced structural composites, the composition comprising:

(a) an unsaturated polyester resin, (b) a co-polymerisable monomer, (c) from 0.4% to 5%, by weight of the total composition, of an organic amide thixotropic agent which has acid and amine values each less than 10 mgKOH/g, (d) fumed silica, and (e) at least one performance-enhancing additive;

the composition comprising less than 2%, by weight of the total composition, of non-polymerisable organic solvent.

19. A method for producing a composition according to claim 18, wherein the thixotropic agent is incorporated in the form of a pregel in the co-polymerisable monomer.

20. A method for producing a composition according to claim 18, wherein the thixotropic agent is incorporated in the form of a heat-activated pregel in a mixture of the co-polymerisable monomer and an organic solvent.

* * * * *